Aug. 14, 1928. 1,680,519
J. D. HOUCK
COFFEE MAKING DEVICE
Filed June 25, 1927    2 Sheets-Sheet 1
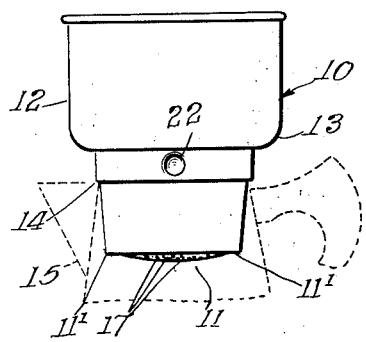
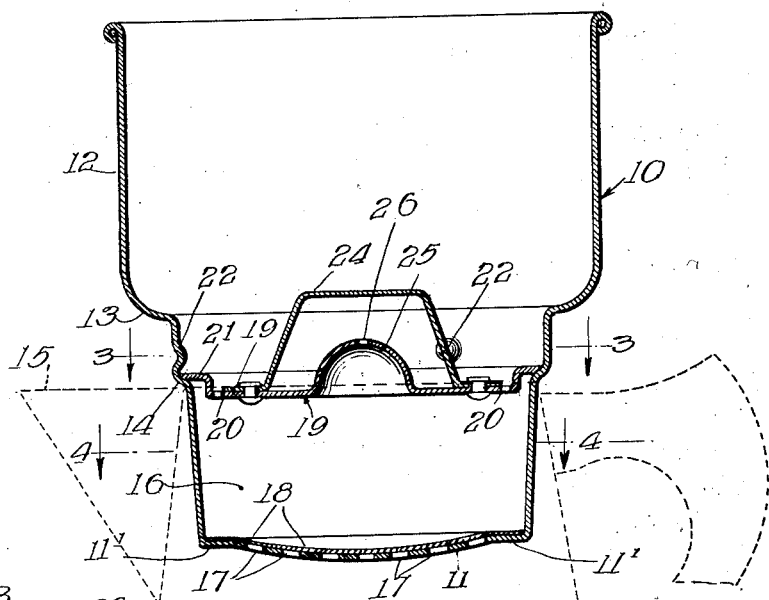
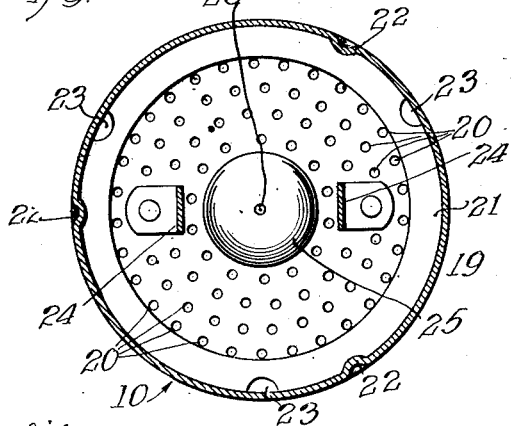
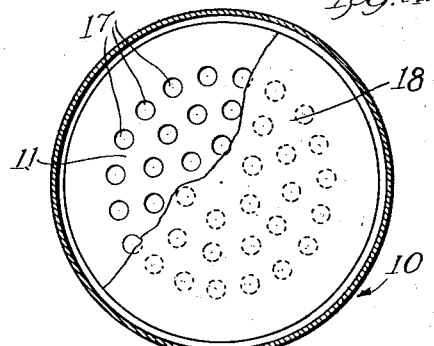
Witness:
Harry C. L. White
Inventor:
John D. Houck.
By Edward Fay Wilson
Atty.

Aug. 14, 1928.
J. D. HOUCK
1,680,519
COFFEE MAKING DEVICE
Filed June 25, 1927
2 Sheets-Sheet 2
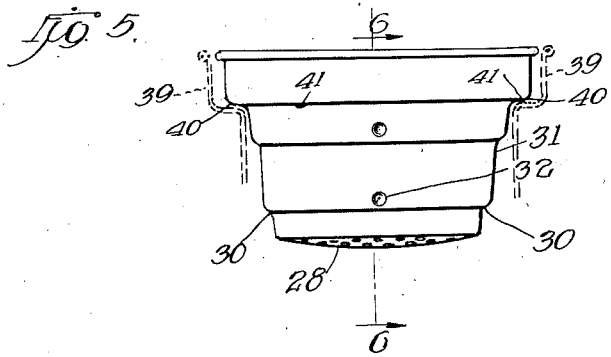
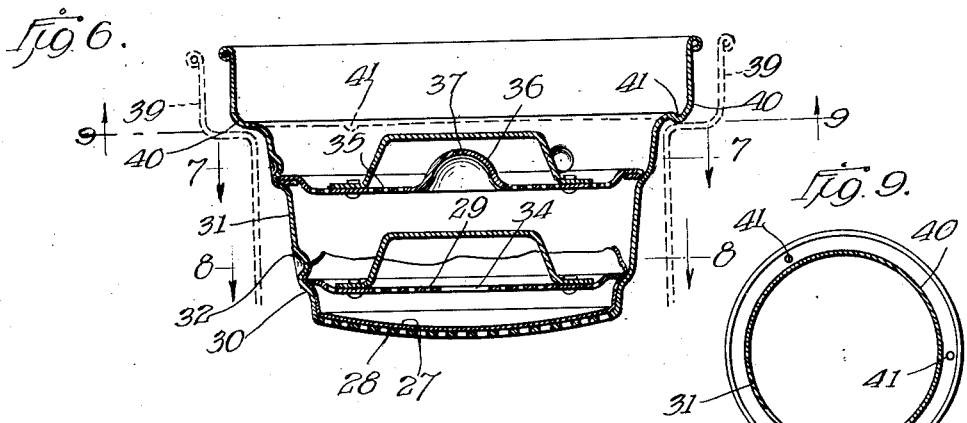
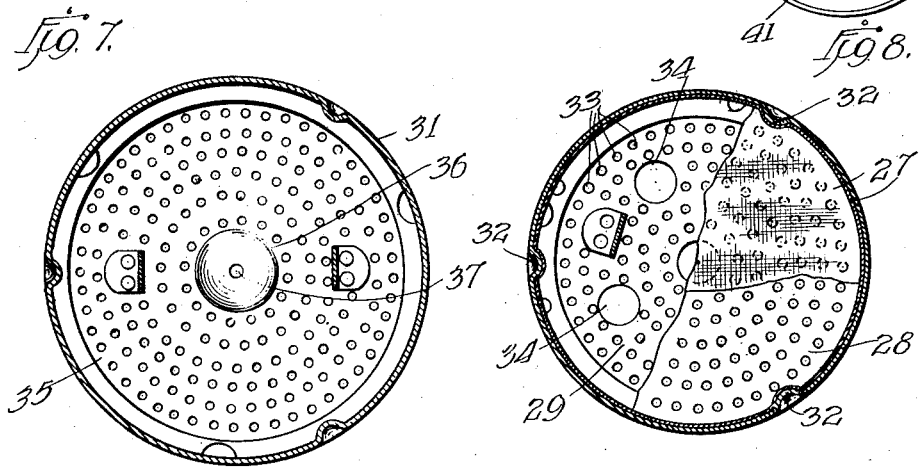

Patented Aug. 14, 1928.

1,680,519

UNITED STATES PATENT OFFICE.

JOHN D. HOUCK, OF CHICAGO, ILLINOIS.

COFFEE-MAKING DEVICE.

Application filed June 25, 1927. Serial No. 201,359.

This invention relates to improvements in coffee making devices and has special reference to improvements in devices for this purpose which are so arranged that hot water is passed slowly through the ground coffee and including means for filtering the product.

The object of the present invention is to provide means for hastening the passage of the water through the ground coffee and thus hastening the preliminary process of extracting the coffee oils and flavors from the ground coffee.

This invention relates particularly to means for venting the portion of the device containing the ground coffee and thus assisting the flow of hot water into and through the ground coffee and also in means for causing the water to more readily drop or drip from this part of the device after it has taken up the coffee oils and flavors.

The invention will be more readily understood by reference to the accompanying drawings forming part of this specification and in which:—

Fig. 1, is a side elevation of a coffee making device embodying my improvement in one form and indicating an associated coffee pot in dotted lines;

Fig. 2, is a vertical central, sectional view of the device;

Figs. 3 and 4, are horizontal sectional views on the lines 3—3 and 4—4, respectively, of Fig. 2;

Fig. 5, is a view similar to Fig. 1 but showing another form or application of my invention;

Fig. 6, is a vertical central, sectional view on the line 6—6 of Fig. 5; and

Figs. 7 and 8, are horizontal sectional views on the lines 7—7 and 8—8, respectively, of Fig. 6.

Fig. 9 is a section on line 9—9 of Fig. 6.

In said drawings 10 represents the casing of the device which is open at its top and is formed with a bottom 11 which is perforated over substantially its whole extent. The upper part 12 of the casing is made of a capacity to contain a sufficient quantity of hot water to make the required quantity of coffee. This part 12 of the casing is larger in diameter than the lower part providing an annular shoulder 13 at the lower end of the part 12 which may be used to support the device upon a suitable vessel, such as a coffee pot, during the process of making coffee.

Below the shoulder 13 the casing is again decreased in diameter providing a second annular shoulder 14, and in the instance illustrated the device is shown as resting upon a coffee pot 15 at this shoulder 14. The casing 10 extends below the shoulder 14 a sufficient distance to provide a space or chamber 16 just above the perforated bottom 11 and which chamber is adapted to contain the ground coffee to be used in the process of making the coffee. In order to extract the coffee oils and flavors by the passage of the hot water through same the coffee beans are fairly finely ground, though not powdered, and the holes 17 in the perforated bottom 11 are large enough to let the ground coffee fall through. To prevent this a sheet 18 of filter material, such as paper or cloth is laid on the bottom 11. Preferably the sheet 18 is cut slightly smaller in diameter than the bottom 11 so that it can be readily dropped down in the casing upon the bottom.

For distributing the hot water from the upper part 12 of the casing upon the coffee in the chamber 16 and causing the water to pass throughout the mass of the ground coffee there is provided a water spreader 19 in the form of a flat disk adapted to fit snugly within the casing and rest upon the annular ledge formed by the shoulder 14. This disk is perforated substantially throughout its whole extent, the holes 20 being relatively small in diameter and very numerous so that the hot water, in passing through the disk or partition 19, is applied to the ground coffee practically throughout its top exposed area. The edge portion 21 of the disk 19 is slightly raised and is not perforated. This prevents the hot water forming vertical channels through the ground coffee next to the sides of the casing. To prevent the disk falling out of position should the device be tipped, there are provided pressed in projections 22 in the wall of the casing 10 just above the shoulder 14, and the disk 19 is provided with notches 23 spaced to match with the spacing of the projections to permit the placing of the disk down upon the shoulder 14 and it is locked in position by a slight rotation from its initial position. A suitable handle 24 is provided secured upon the upper surface of the disk 19 by which it can be readily manipulated in placing or removing it.

As the coffee is fairly finely ground, it does not readily give up its air and permit the entrance of the water, and a particular object of the present invention is for hastening this process. This is accomplished by forming the middle portion of the disk 19 into an upwardly extending dome 25 and providing a vent hole 26 in the top of the dome. The difference in height from the disk 19 to the top of the dome 25, though relatively slight, is sufficient to cause the air caught below the disk to escape rapidly through the vent hole 26 and bubble up through the water in the upper part 12 of the casing. It will be readily understood that while I have shown a rounded up dome 25 similar in shape to a half sphere other forms could be used, the essential feature being that the vent hole 26 is above the disk 19.

It is well known that where a liquid drips through a bottom wall of a vessel if the bottom is flat and horizontally disposed the drops are not readily separated from the bottom, but have to reach a considerable size before they drop off. This is considerable of a detriment, especially as in the present device the bottom is perforated, for in this instance this tendency causes the drops to adhere to the bottom at the peripheries of the perforations, thus slowing down the seeping of the liquid through the ground coffee and slowing the whole process. To avoid this slowing effect I have found that if the bottom is slightly inclined to the horizontal the drops will naturally flow or run down the bottom and thus be put in motion and will etiher drop off at the edges of the holes or at the lowest point or portion of the bottom. Instead of inclining the bottom all in one direction I have found that it is just as efficient to make the bottom 11 in effect slightly coned or rounded as shown. This slight inclination of the bottom 11 from its circumference to its center is sufficient to greatly accelerate the flow of the hot water through the coffee and the filter sheet 18.

The circumferential marginal portion 11' of the perforated bottom 11 is made flat and without holes so that the ground coffee lying on the margin of the sheet of filter material will hold the sheet in position and prevent the water raising the filter and running in under same.

In Figs. 5 to 8, inclusive, I have illustrated another form of my improvement. In this form instead of using a loose sheet of filter paper, as shown in Fig. 2, I make use of a piece 27 of filter cloth, and there is provided means for securing this filter cloth in position just above the perforated bottom 28. This securing means consists of a removable partition or head 29 quite similar to the partition 19 already described and similarly held or secured in position upon an internal shoulder 30 similar to the ledge 14. In placing the filter cloth 27 in position it is placed upon the bottom of the head 29, the head 29 and the casing 31 being both inverted, then the head 29 is inserted up into the casing against the shoulder 30 and locked in position by the pressed in projections 32 in the manner already described in relation to the perforated head 19. The head 29 besides having many small holes 33 is also provided with quite a number of relatively large holes or openings 34 through which the ground coffee can pass into the open space below this head and onto the filter cloth. In loading this device it should be agitated to cause the ground coffee to pass through this head 29 and fill the space below it, forcing the filter cloth down upon the perforated bottom 28 which, as in the former instance, is slightly coned to accelerate the seepage of water through the device. Suitably spaced above the head 29 is a flat perforated spreader head or plate 35 similar to the spreader head 19 already described, and this head 35 is also provided with a central upstanding dome 36 with a vent hole 37 at its top for a similar purpose as the dome 25 and vent hole 26.

The form shown in Figs. 5 to 8 is usually placed upon a coffee urn 38 of relatively large capacity, such as is used in hotels and restaurants, and such urns usually have an enlarged top having a sunken circumferential shoulder 39 for supporting a cover. The device is set down in the top of the urn and the circumferential shoulder 40, which is similar to the shoulder 13 in the smaller form, is adapted to rest on the shoulder 39. The urns unlike coffee pots do not have a vent and to prevent the tight closing of the urn by the device and the consequent stoppage of the flow of water through the device means are provided for holding the shoulder 40 of the device spaced from the shoulder 39 of the urn. In the form shown this means consists of projections 41 formed on the shoulder 39. These projections are preferably formed by pressing them down out of the metal of the casing though obviously they might be produced in many other ways. The essential feature is to vent the urn and permit a free seepage of the water through the device.

In practice the form shown in Fig. 2 is made in the smaller sizes for family use, while the form shown in Fig. 6 is better adapted for larger quantities, as in hotels and restaurants. In both forms the ideas of venting the coffee space by means of the elevated vent opening and the acceleration of the seepage by the inclined bottom are present.

As many modifications of my invention will readily suggest themselves to one skilled in the art, I do not limit or confine my invention to the specific details of structure and arrangement of parts and features herein shown and described.

I claim:

1. In a coffee making device, a casing adapted to contain ground coffee in its lower part, and provided with a perforated slightly dished bottom, the bottom adapted to have a sheet of filtering material supported thereon, and a spreader adapted to be removably held above said bottom.

2. In a coffee making device, a casing adapted to contain ground coffee in its lower part, and provided with a perforated slightly dished bottom, the bottom adapted to have a flat sheet of filtering paper supported thereon, a spreader adapted to be removably held above said bottom, and said spreader having a part rising above the general plane of the spreader, and said part having a vent hole in its upper portion.

3. In a coffee making device, a casing adapted to contain coffee in its lower part and having a slightly dished perforated bottom, said bottom adapted to support a sheet of filtering material for preventing the coffee falling through the perforations, and a spreader plate arranged suitably spaced above the bottom, the spreader plate having a part extending above the general plane of the plate, and said part having a vent hole in its upper portion.

4. In a coffee making device, a casing open at its top and closed at its lower end by a perforate bottom, said bottom being slightly dished, as and for the purpose specified.

5. In a coffee making device, a casing open at its top and closed at its lower end by a perforate bottom, a spreader plate adapted to be supported above the bottom, said plate formed to provide an upwardly rising central dome, and the dome having a vent hole in its top.

6. In a coffee making device, a casing open at its top and closed at its bottom by a perforate bottom, the lower surface of the bottom being slightly dished, and said bottom being adapted to receive and support a flat paper filter sheet, as and for the purpose specified.

7. In a coffee making device, a casing adapted to contain ground coffee in its lower part, and provided with a perforated slightly dished bottom, the bottom adapted to have a sheet of filtering material supported thereon, and the marginal portion of the bottom being flat, as and for the purpose specified.

8. In a coffee making device, a casing open at its top and closed at its lower end by a perforate bottom, said bottom being slightly dished, and the marginal portion of the bottom being flat, as and for the purpose specified.

9. In a device of the kind described, a casing open at its top and closed at its lower end by a perforate bottom, the casing having an external circumferential shoulder adapting it to be supported in the top of a suitable vessel on a circumferential shoulder thereon, and means for preventing a complete circumferential contact of the two shoulders, as and for the purpose specified.

10. In a device of the kind described, a casing open at its top and closed at its lower end by a perforate bottom, the casing having an external circumferential shoulder adapting it to be supported in the top of a suitable vessel on a circumferential shoulder thereon, and projections on the shoulder of the device for preventing a complete circumferential contact of the two shoulders, as and for the purpose specified.

11. In a coffee making device, a casing open at its top and closed at its lower end by a perforate bottom, means for securing a sheet of filtering material in the lower end of the casing in position to contact with the bottom, a spreader head adapted to be removably held spaced above the filter sheet and said spreader having a part formed upwardly provided in its top with a vent opening for venting the space beneath same.

In testimony whereof, I have hereunto set my hand, this 26th day of May, 1927.

JOHN D. HOUCK.